Dec. 28, 1948.  F. F. PAZZANO  2,457,715
BAIT HOLDING CASTING BOB
Filed Nov. 5, 1946
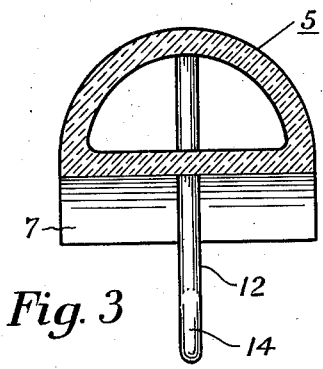
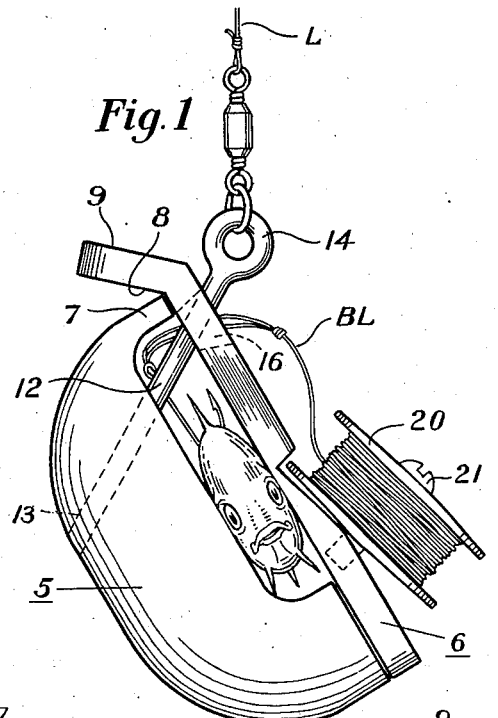
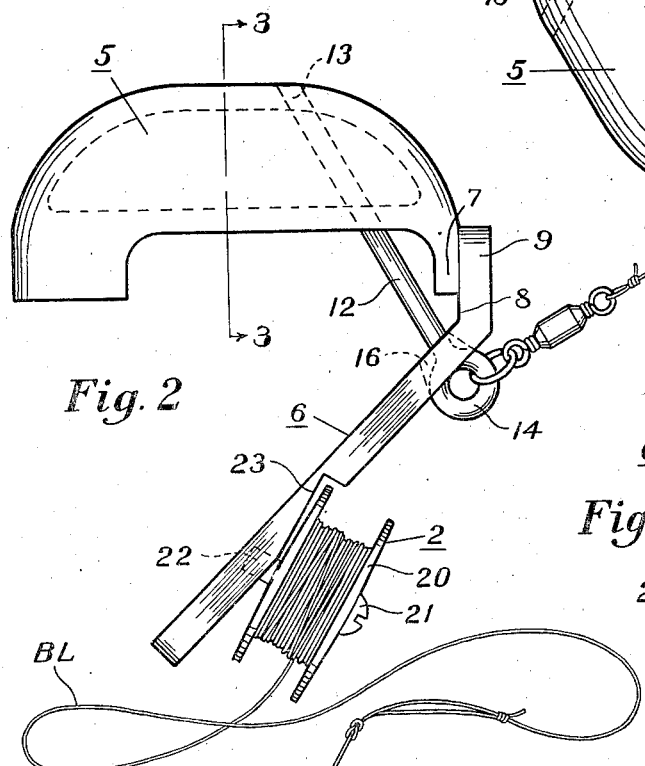
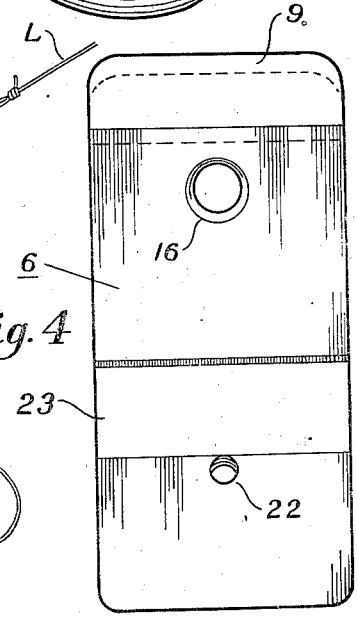
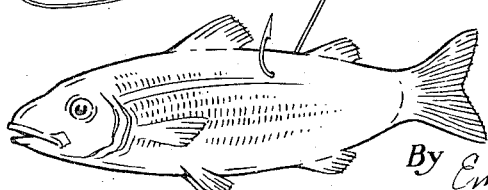
Inventor
Frederick F. Pazzano
By Emery, Booth, Townsend, Miller & Widner
Attorneys Patented Dec. 28, 1948

2,457,715

UNITED STATES PATENT OFFICE 2,457,715

BAIT-HOLDING CASTING BOB

Frederick F. Pazzano, Waltham, Mass.

Application November 5, 1946, Serial No. 707,893

7 Claims. (Cl. 43—41)

My present invention relates to fishing tackle. More particularly it aims to provide a new and improved casting bob especially adapted for live bait and including means to hold and protect the bait during a cast and to release and buoyantly tether the bait or lure in the water to be fished.

In the drawings illustrating by way of example one form of casting bob embodying the invention:

Fig. 1 is a side elevation of the bob in loaded and suspended position as when ready to be cast;

Fig. 2 shows the bob in floating position after casting;

Fig. 3 is a cross-section of the buoyant jaw as on the line 3—3 of Fig. 2; and

Fig. 4 shows the other jaw separately in plan.

Referring to the drawings in more detail, the device as a whole comprises two main elongated pincer-like parts or jaws generally indicated respectively at 5 and 6. These two jaw members are movably associated at one end, herein called the coupling end, for relative closing and opening movement between a bait-gripping casting position as in Fig. 1 and an open floating position as in Fig. 2. The provision for relative closing and opening movement or swinging of the parts is made such as to insure free action at the desired times. This may be variously accomplished. In the selected example the jaw 5 has at the coupling end an angular nose 7 abuttively engageable in an open seat 8 at the corresponding end of the other jaw 6, the nose and seat 7, 8 together defining a region of mutual contactive support for the relative opening and closure of these two main parts or jaw members 5 and 6.

One of the parts, herein the jaw 5, is of a buoyant construction adapting it to function as a float adequate to support the device as a whole in a body of water. It may be fashioned of a material such as wood or cork adapted to float upon water or of other material molded or otherwise shaped to hollow or partly hollow form, various of the synthetic plastics being suitable for the purpose. The coacting movably related jaw 6 comprises a body or strip coextensive in length with the buoyant jaw 5. It is of such material and so constructed as to be relatively heavier or less buoyant than the float jaw 5, so that the latter will assume the uppermost position when the device is in or floating at the surface of a body of water. For this purpose the jaw 6 may be metallic or of other material suitably weighted if required. Lengthwise beyond the seat 8 the jaw 6 has an angular extension or wing 9 for purposes to be referred to. The base of the wing herein presents an abutment defining one wall of the seat 8 which movably receives the nose 7 of the opposite jaw member.

The two jaw elements 5 and 6 are operatively retained in the described swingable relation by connecting and guiding means. Such means as illustrated comprises a pin or post 12 having one end 13 fixed in one jaw, for example the buoyant jaw 5, the pin projecting laterally and angularly at the inner face of said jaw. The pin 12 is of a length to extend through and somewhat beyond the other jaw, the weighting jaw 6 in the illustrated instance. Said jaw 6 has a pin receiving and guiding aperture 16 located, shaped and proportioned to afford the described free movement for the two jaw members 5 and 6 as between the closed and open positions of Figs. 1 and 2 respectively. The pin-guiding aperture 16 is located above the center of gravity of the jaw 6 as a whole. Hence the latter tends to slide freely on the pin 12 as well as swinging into the closed gripping relation to the opposite jaw 5. The connector pin 12 has an enlargement or head at the outer end, retaining the jaw members against unintended disconnection. As illustrated such head is in the form of an eye 14 providing means for line attachment, a hand-line L being shown so attached in Figs. 1 and 2. In some instances the hook-carrying bait line BL may also be secured at the pin eye 14 should it be preferred to omit the reel 20 therefor to be described.

It will be noted with reference to Fig. 1 that the angular relation of the pin 12 to a line drawn through the coupling region 7, 8 and paralleling the long axis of the jaw members 5, 6, and the lateral extent and location of the pin 12 with respect to the center of gravity of the bob as a whole, are such that in the suspended position as in Fig. 1 the jaws automatically assume the closed gripping relation and are somewhat tilted from the vertical. For the same reasons this closed or mutually gripping relation also is maintained under centrifugal force when the bob is swung or twirled attendant on casting it.

The bait line BL in effect is a continuation of the hand line L and may if preferred be an integral part of the latter. The length of the bait-line BL is selected in accordance with the maximum depth below the water surface to be afforded for the bait and may be adjusted by the user. As previously noted the bait-line BL may be variously attached to the casting bob. In the example illustrated it is carried by a reel or bobbin 20 rotatably mounted on the weighting jaw 6 as by a pin or screw 21 tapped into the latter as at 22. One end of the bait-line BL is secured to the reel, the line being wound onto the latter in the casting position of the device as in Fig. 1. As seen in Fig. 2 the axis of the bobbin as defined by the screw 21 is laterally disposed with respect to the weighting jaw 6 and to the floating position of the bob as a whole that upon release of the bait as in Fig. 2 the bait-line BL is free to unwind downwardly under the action of the bait. If desired the reel-carrying jaw 6, which has the general form of a strip or bar as seen separately in Fig. 4, may be recessed as at 23 to accommodate the reel 20.

The operation of the casting bob will be apparent from the description in connection with the drawings. The hand line L to which the bob is attached may be employed with or without a casting rod. The live bait represented as a minnow, shiner or the like is engaged on the hook of the bait-line BL and is placed transversely between the jaws 5 and 6 in the general manner as in Fig. 1, the bait-line being wound on the reel 20. In a suspended position of the device as in Fig. 1 the jaw pair automatically closes onto and holds the bait while the bob is being cast, centrifugal action with respect to the bob aiding in this connection. When the device strikes the surface of the water the jaw pair automatically opens and the bob assumes a floating position substantially as in Fig. 2. The buoyant jaw 5 floats in a general horizontal position, while the weighted jaw opens downward releasing the bait and permitting it to move about in the water within the limit of the bait-line.

As seen in Fig. 2 the angular extension or wing 9 at the coupling end of the device serves as an abutment stop limiting the opening of the jaws. It also serves to insure jaw opening and release of the bait should opening be delayed after impact on the water. A sharp pull imparted to the hand line causes the wing 9 to thrust against the water and thereby swing the jaw 6 pivotally downward to the Fig. 2 position.

It will be evident that the combined bait holder and casting bob of the invention serves to protect the bait during a cast and the impact with the water, preventing the bait such as the live minnow of the drawing from being torn off the hook either under the action of the cast or upon impact. The device of the invention thus provides for safe carriage of the bait to the desired area of the water and further insures release of the bait at such area for free movement in the vicinity of the floating bob subject only to tethering by the bait-line BL.

My invention is not limited to the particular embodiment thereof illustrated and described herein, and I set forth its scope in my following claims.

I claim:

1. A live-bait casting bob comprising a member recessed on one side to receive a live-bait in said recess, a cover for the recess swingably connected to the member, and supporting means for the member and cover secured to the member and extending through the cover, said cover having an opening of such size as to permit the supporting means to be slidably and swingably related thereto.

2. A live-bait casting bob comprising a holder member recessed on one side to receive a live-bait in said recess, a cover member for the recess movably connected to the holder member to close laterally and to open the recess, and supporting means for said members secured to one of them and extending through the other member, said other member having an opening for the passage of the supporting means of a size permitting relative movement of the members between recess closing and opening positions thereby to grip and to release the bait.

3. A live-bait casting bob comprising a pair of jaws swingably coupled at one end to close and open in pincer fashion, opposed faces of the jaws together presenting a bait-holding formation, one jaw being buoyant and the other relatively heavy, a connector pin projecting from the inner face of the buoyant jaw and angularly extending loosely through the heavier jaw to retain them in opposed relaitvely swingable relation, hand-line attaching means at the projecting end of the pin, and means to secure a bait-line to the bob, the jaws, pin and attaching means constructed and arranged for tilted bait-gripping closure of the jaws under suspension or swinging of the hand-line attached bob, and the jaws being adapted to open and release the bait on impact of the cast bob with water, the buoyant jaw then floating the bob with the heavier jaw pendantly open and the bait tethered thereto by the bait-line.

4. A bait casting bob comprising a pair of jaws movably coupled at one end, one jaw embodying a float and the other a weight, opposed faces of the jaws together presenting a gripping formation for a baited hook, a pin having one end set in one jaw and projecting angularly at the inner face thereof, the other jaw having adjacent the coupling end an aperture loosely receiving the pin whereby the jaws are mutually guided for relative swinging closure and opening, the outer end of the pin presenting hand-line attaching means, and means carried by one jaw for securing a hook-line to the bob.

5. A live-bait casting bob comprising a pair of jaw members swingably coupled at one end, one embodying a float and the other a weight, opposed faces of the jaw members together presenting a bait-gripping formation for a baited hook, a pin set in the float member to project angularly at the inner face thereof, the weighted member having adjacent its coupled end an aperture loosely receiving the pin whereby the two members are mutually guided for swinging closure and opening, the outer end of the pin laterally beyond the weighted member having hand-line attaching means, and a reel for a bait tether rotatably mounted at the outer face of the weighted member in downward unreeling position.

6. A bait casting bob comprising opposed jaw-like members disposed in relatively swingable coupled relation at one end with the inner faces defining a gripping formation, one member constituted as a float and the other as a weight, coupling means extending angularly from one member toward and loosely through the other member and including provision for line attachment, and a terminal wing at the coupled end of one member projecting across the other member so as to assist and to limit relative swinging movement thereof to open position.

7. A bait casting bob comprising opposed jaw-like members having coupling ends and opposite free ends, one member having at the coupling end a positioning nose and the other member having at the corresponding end an abutment movably receiving said nose, one member constructed to float on water and the other member defining a weighting element, a gripping formation presented mutually by the opposed inner faces of said members, and a pin-like connection extending angularly between the members and relatively guiding them for closure and opening movement to grip and to release a bait.

FREDERICK F. PAZZANO.

REFERENCES CITED

The following references are of record in the file of this patent:

UNITED STATES PATENTS

| Number | Name | Date |
|---|---|---|
| 1,147,472 | Westbury | July 20, 1915 |
| 1,764,738 | Marsters | June 17, 1930 |
| 2,435,011 | Mason | Jan. 27, 1948 |